United States Patent [19]

Ito et al.

[11] Patent Number: 5,233,535
[45] Date of Patent: Aug. 3, 1993

[54] METHOD FOR AND APPARATUS FOR CONTROLLING TAPPING PROCESS

[75] Inventors: Norio Ito; Masato Ryoki, both of Aichi, Japan

[73] Assignee: Kabushiki Kaisha Okuma Tekkosho, Aichi, Japan

[21] Appl. No.: 502,284

[22] Filed: Mar. 30, 1990

[30] Foreign Application Priority Data

Mar. 30, 1989 [JP] Japan ................... 1-79556

[51] Int. Cl.⁵ ............................... G05B 19/24
[52] U.S. Cl. ..................... 364/474.34; 364/474.32; 318/571
[58] Field of Search ........ 364/474.34, 474.35, 364/474.17, 474.18, 474.19, 474.15, 474.28, 474.32; 318/569, 571

[56] References Cited

U.S. PATENT DOCUMENTS

| | | | |
|---|---|---|---|
| 4,045,660 | 8/1977 | Weisgerber et al. | 364/474.34 |
| 4,353,018 | 10/1982 | Kohzai et al. | 318/571 |
| 4,484,287 | 11/1984 | Gamo et al. | 364/474.19 |
| 4,513,380 | 4/1985 | Spooner | 364/474.34 |
| 4,565,950 | 1/1986 | Kikuno | 318/85 |
| 4,575,791 | 3/1986 | Schwefel | 364/474.34 |
| 4,597,040 | 6/1986 | Bulzer | 364/474.34 |
| 4,604,560 | 8/1986 | Inagaki et al. | 318/567 |
| 4,656,405 | 4/1987 | Kiya et al. | 318/571 |
| 4,879,660 | 11/1989 | Asakura et al. | 364/474.15 |
| 4,941,104 | 7/1990 | Teshima et al. | 364/474.3 |
| 4,983,899 | 1/1991 | Komatsu et al. | 318/571 |
| 4,992,712 | 2/1991 | Fujimoto et al. | 318/569 |
| 5,117,368 | 5/1992 | Yamaguchi et al. | 364/474.32 |

Primary Examiner—Jerry Smith
Assistant Examiner—Paul Gordon
Attorney, Agent, or Firm—Wenderoth, Lind & Ponack

[57] ABSTRACT

In a control method and device for tapping, the phase difference between the spindle and the feed shaft at suspended positions is made equal to zero by controlling the rotation of the spindle of the feed of the feed shaft in a manner to minimize the damage on the machined portion and the rotation of the spindle and feed on the feed shaft are subsequently synchronized to reset them to their starting positions, thereby enabling an automatic reset operation.

3 Claims, 4 Drawing Sheets

METHOD FOR AND APPARATUS FOR CONTROLLING TAPPING PROCESS

BACKGROUND OF THE INVENTION

This invention relates to a method and apparatus for controlling tapping with a tapper or the like.

When tapping is performed with a tapper, it is necessary to control the rotationship of a spindle and the feed on a feed shaft in a manner to maintain a certain correlation between the relative rotational angles and the relative feeds of a work and a tapper or, more particularly, the phase difference between the work and the tapper must constantly be equal to zero. In the prior art, therefore, tapping has been controlled by providing a positional control function on the control of the spindle similarly to that of the feed shaft to thereby synchronize rotation of the spindle and feed on the feed shaft.

FIG. 1 is a block diagram showing an embodiment of a tapping control device to realize the above mentioned prior art control method. In this device, when a command for the relative rotation angle (referred to as "rotation angle of the spindle" hereinafter) of the spindle and a command for the relative feed (referred to as "feed on the feed shaft" hereinafter) on the feed shaft are inputted to a normal synchronization controlling section 2 from a rotation angle/feed command section 1, a control command for synchronizing rotation of the spindle and feed of the feed shaft is respectively sent to a spindle rotation controlling section 3 and a feed shaft feeding controlling section 6. The drive of a spindle driving section 4 is controlled in accordance with the rotation angle of the spindle which is detected by a spindle rotation angle detecting section 5, and the drive of a feed shaft driving section 7 by the feed on the feed shaft which is detected by a feed shaft feeding detecting section 8.

In the above mentioned prior art controller for tapping, when tapping is suspended, for instance, due to a failure in the tapper while the controller is being operated, the subsequent operation cannot be re-started automatically. The operator, instead, has to turn and remove the tapper manually with utmost care for resetting the process in order to minimize the damage to the machined portion.

SUMMARY OF THE INVENTION

This invention was contrived to solve problems encountered in the prior art, and aims at providing a control method for tapping which can be automatically reset even if tapping is suspended while being controlled and a device therefor.

According to one aspect of this invention, for achieving the objects described above, a control method for tapping is provided wherein rotation of the spindle and feed of the feed shaft are synchronized for tapping, which is characterized in that, when tapping process is to be reset after a suspension during controlled tapping, rotation of said spindle or feed of said feed shaft is performed in a manner to make the phase difference between said spindle and said feed shaft at their suspended positions equal to zero and that rotation of said spindle and feed of said feed shaft are subsequently synchronized to be reset to prescribed positions.

According to another aspect of this invention, a control method is provided for tapping wherein tapping is performed by synchronizing rotation of a spindle and feed of a feed shaft, which is characterized in that, when a tapping process is to be reset after a suspension during controlled tapping, the first reset position is calculated from the rotational direction of said spindle, feed direction of said feed shaft, rotational angle of said spindle and feed on said feed shaft, and that said spindle or said feed shaft is moved from said suspended position to the first reset position, and that said spindle and feed shaft are synchronously moved to the second reset position.

Further, according to still another aspect of this invention, a control device is provided for tapping which synchronizes the rotation of the spindle and feed of the feed shaft for tapping, which comprises a memory means for storing relative rotational directions of said spindle and relative feed directions of said feed shaft, a means to read out said rotational direction and said feed direction at the positions at which suspending motion is started upon receipt of a suspension command as well as the relative rotational angle of said spindle and relative feed on said feed shaft at suspended positions, a means to control rotation of said spindle or feed of said feed shaft in a manner to make the phase difference between said spindle and said feed shaft at said suspended positions equal to zero based on the rotational direction, feed direction, rotation angle and feed which have been read out, and a means to synchronize rotation of said spindle and feed of said feed shaft so as to reset them to the prescribed positions.

The nature, principle and utility of the invention will become more apparent from the following detailed description when read in conjunction with the accompnaying drawings.

DESCRIPTION OF THE PREFERRED EMBODIMENTS

Figure 1:
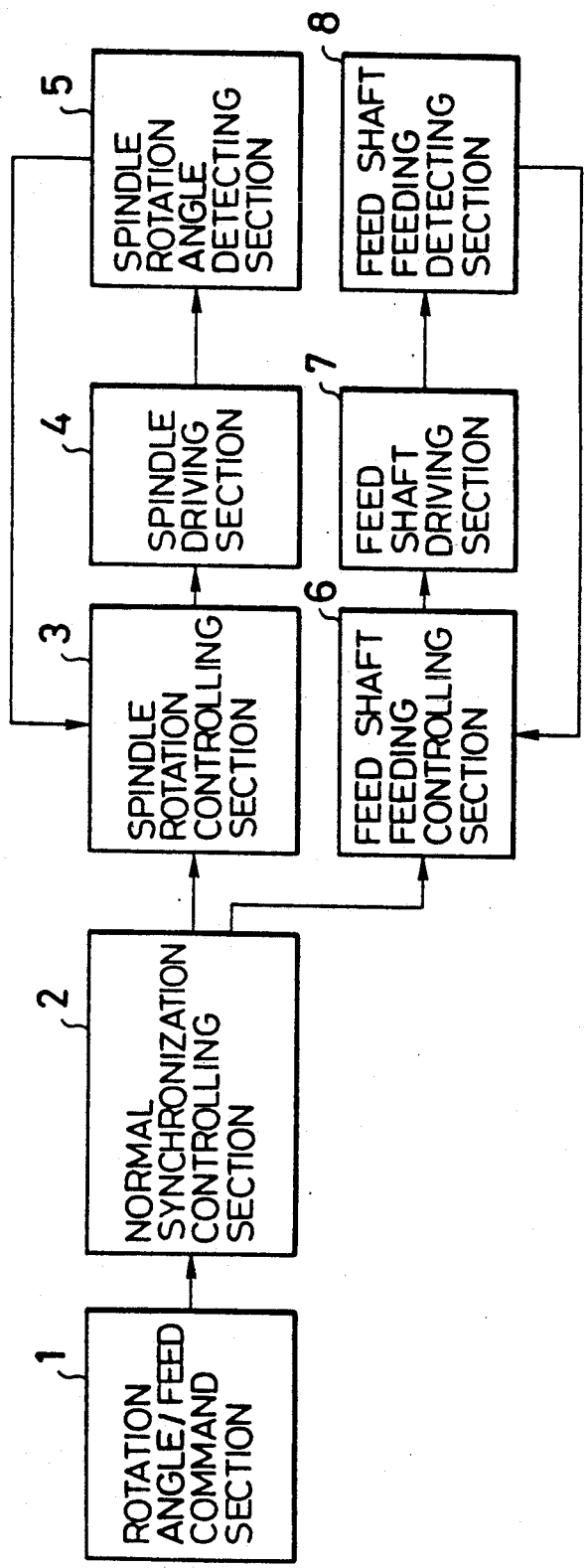
FIG. 1 is a block diagram showing an embodiment of a prior art control device for tapping.
Figure 2:
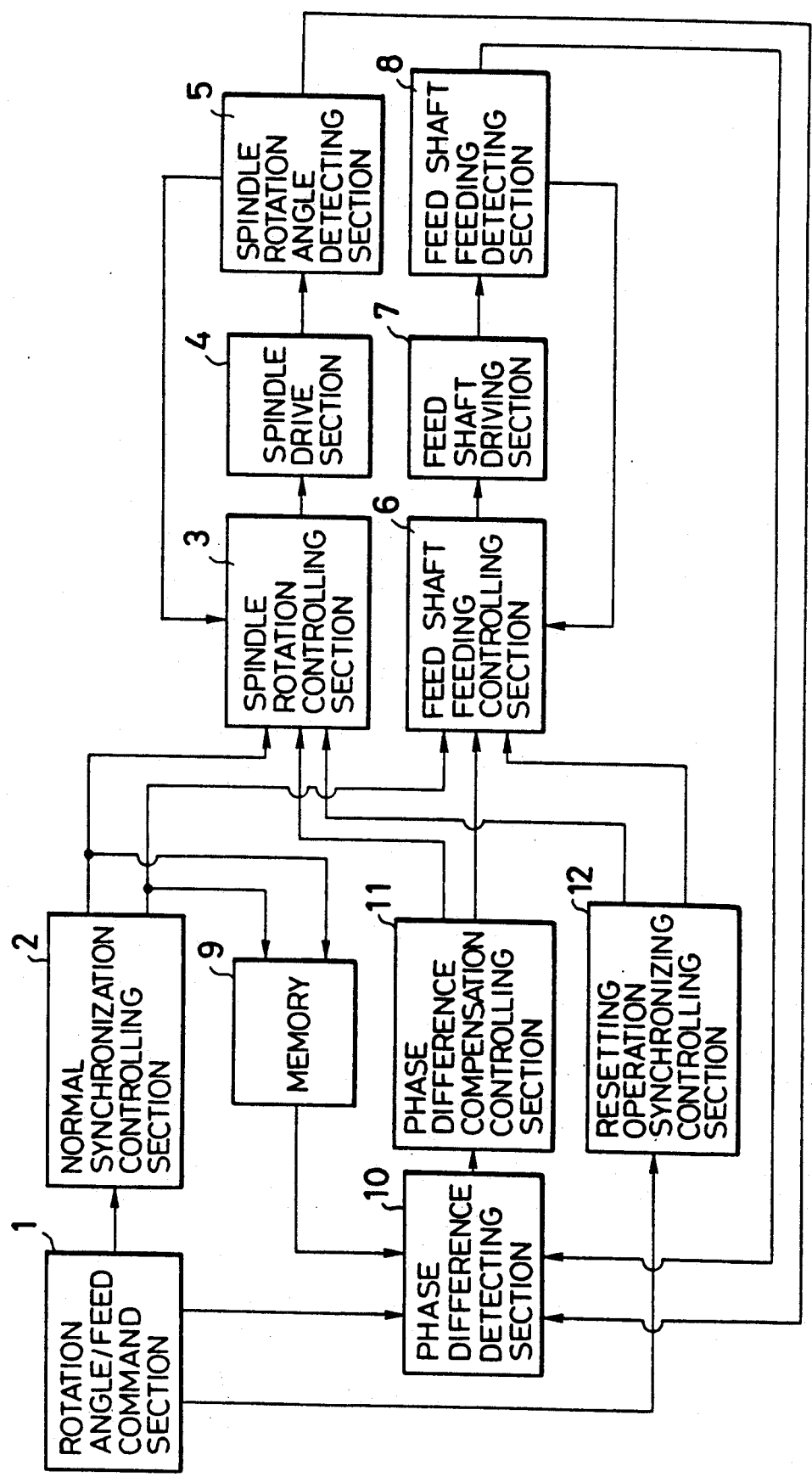
FIG. 2 is a block diagram showing an embodiment of a control device for tapping according to the present invention.

FIG. 2 is a block diagram showing an embodiment of a control device for tapping according to the present invention in correspondence to FIG. 1. The same components are denoted with the same reference numerals to avoid a duplicate explanation. In this device, the relative rotational direction (referred to as the "rotational direction of the spindle" hereinafter) of the spindle and the relative feed direction (referred to as the "feed direction of the feed shaft" hereinafter) of the feed shaft in the normal tapping operation controlled by the normal synchronization controlling section 2 are stored in a memory 9 for rotational direction of the spindle/feed direction of the feed shaft. Upon receipt of command for suspending tapping operation from the rotational angle/feed command section 1, the rotation angle of the spindle and the feed on the feed shaft at the suspended position are read out from the spindle rotation angle detecting section 5 and the feed shaft feeding detecting section 8, and the rotational direction of the spindle and the feed direction of the feed shaft from the memory 9 for the rotation direction of the spindle/feed direction of the feed shaft, by a phase difference detecting section 10. The first reset position which makes the phase difference between the spindle and the feed shaft equal to zero is then determined by a phase difference compensation controlling section 11, and a control command for rotation of the spindle or feed of the feed shaft from the suspended position to the first reset position is sent out to the spindle rotation controlling section 3 or the feed shaft feeding controlling section 6. The second reset position is then read out by a resetting operation synchronizing controlling section 12 from the rotational angle/feed command section 1, and the control command for synchronization of the rotation of the spindle and the feed of the feed shaft from the first positions to the second positions is sent out to the spindle rotation controlling section 3 and the feed shaft feeding controlling section 6.

Figure 3:
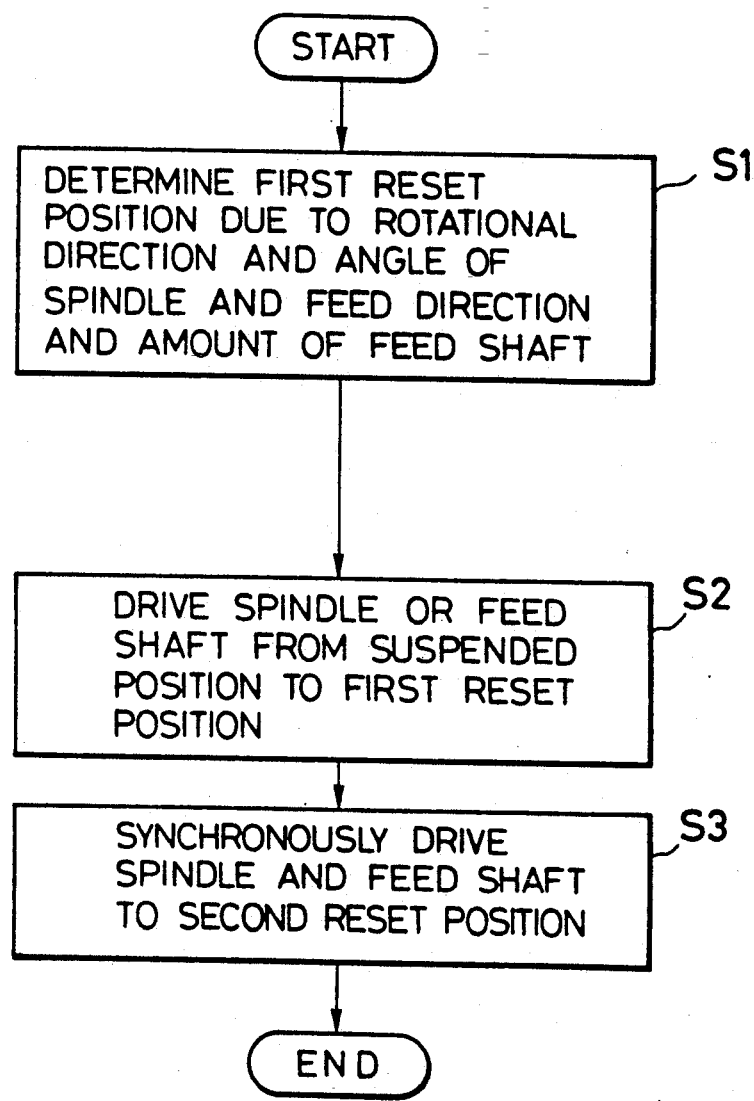
FIG. 3 is a flowchart to explain examples of the operation steps thereof.

An example of the operation steps in such construction will be explained by way of the flowchart shown in FIG. 3.

Figure 4:
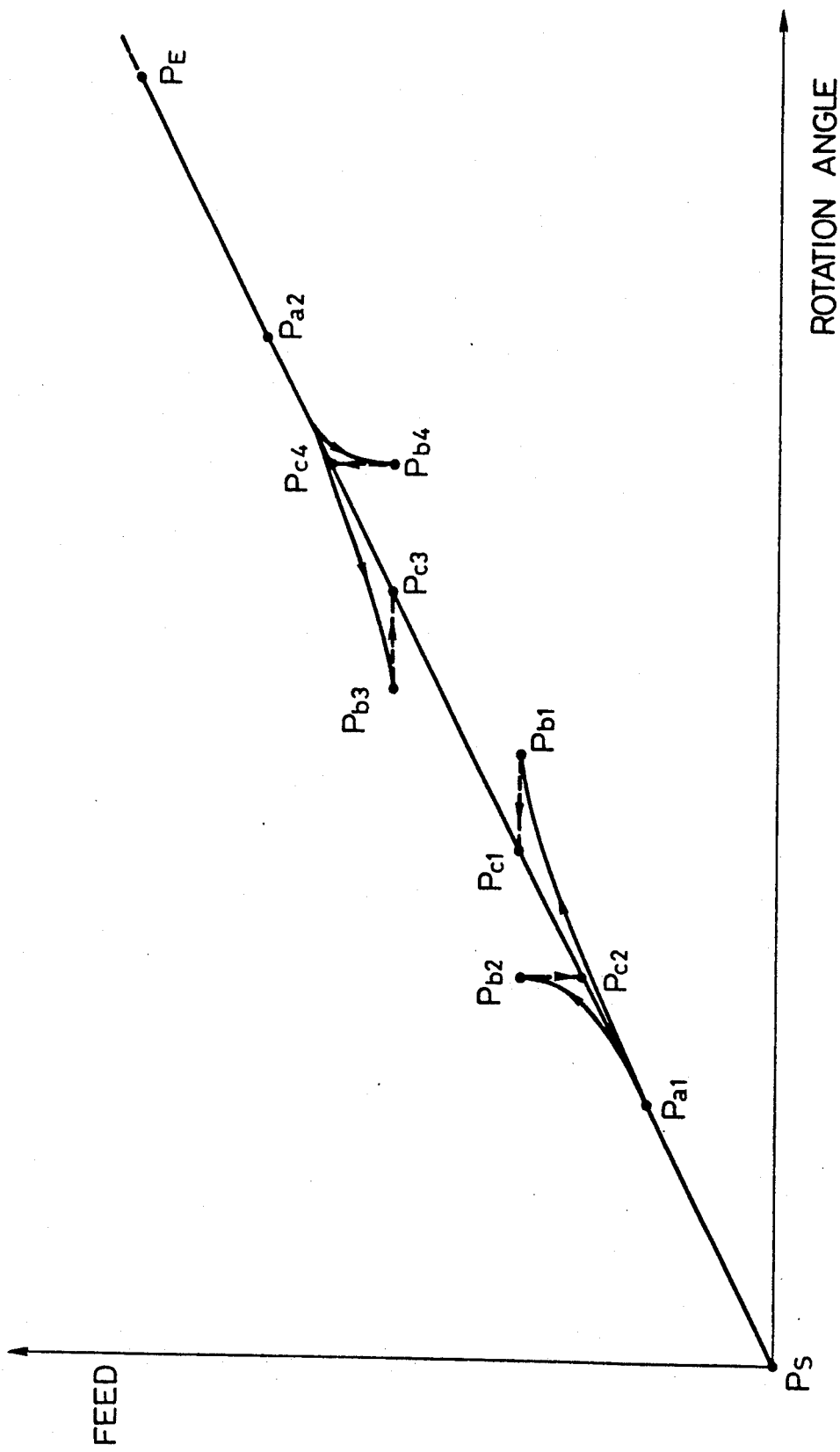
FIG. 4 is a graph to explain tapping operation.

The tapping operation consists of a forward motion from a start position PS to an end position PE and a backward motion from the end position PE to the start position PS. The relationship between the rotational angle of the spindle and the feed on the feed shaft in such a tapping operation becomes as shown in FIG. 4. For instance, if the start position for suspending the operation in the forward motion is expressed as Pa1, the suspended position would be Pb1 or Pb2; if the start position for suspending the operation in the backward motion is expressed as Pa2, the suspended position would be Pb3 or Pb4. When the suspending motion is started, the phase difference detecting section 10 reads out the rotational direction of the spindle and the feed direction of the feed shaft from the memory 9 and the rotational angle of the spindle and the feed on the feed shaft at the suspended position Pb1, Pb2, Pb3 or Pb4 from the spindle rotation angle detecting section 5 and the feed shaft feeding detecting section 8. The phase difference compensation controlling section 11 then determines the first reset position Pc1, Pc2, Pc3 or Pc4 which would minimize the damage at the machined portion using the following equation (1) or (2) (Step S1).

In the equations, the coordinates for the start position for tapping PS, end position PE, suspended position Pbn (n = 1, 2, 3, 4) and the first reset position Pcn (N = 1, 2, 3, 4) are denoted respectively as PS (SS, ZS), PE (SE, ZE), Pbn (Sbn, Zbn) and Pcn (Scn, Zcn).

All of the S and Z variables noted herein are respectively the angles and distances in a radial coordinate system.

If rotation of the spindle and feed of the feed shaft are in the positive direction (forward motion) and:

$$\frac{Z_{bn}}{S_{bn}} > \frac{Z_E - Z_S}{S_E - S_S}$$

or if rotation of the spindle and feed of the feed shaft are in the negative direction (backward motion) and:

$$\frac{Z_{bn}}{S_{bn}} < \frac{Z_E - Z_S}{S_E - S_S}$$

then the following equation (1) holds:

$$(S_{cn}, Z_{cn}) = \left( S_{bn}, \frac{Z_E - Z_S}{S_E - S_S} S_{bn} \right) \quad (1)$$

If rotation of the spindle and feed of the feed shaft are in the positive direction (forward motion) and:

$$\frac{Z_{bn}}{S_{bn}} < \frac{Z_E - Z_S}{S_E - S_S}$$

or if rotation of the spindle and feed of the feed shaft are in the negative direction (backward motion) and:

$$\frac{Z_{bn}}{S_{bn}} > \frac{Z_E - Z_S}{S_E - S_S}$$

then the following equation (2) holds:

$$(S_{cn}, Z_{cn}) = \left( \frac{Z_E - Z_S}{S_E - S_S} Z_b, Z_b \right) \quad (2)$$

The phase controlling section 11 sends out a control command for rotation of the spindle or feed of the feed shaft from the suspended position Pbn to the first reset position Pcn to the spindle rotation controlling section 3 or to the feed shaft feeding controlling section 6 to rotate the spindle or move the feed shaft (Step S2). The resetting operation synchronizing controlling section 12 reads out the second reset position (start position PS for tapping in this case) from the rotation angle/feed command section 1, and sends out a control command for synchronization of rotation of the spindle with feed of the feed shaft from the first reset position Pcn to the second reset position PS to the spindle rotation controlling section 3 and the feed shaft feeding controlling section 6 to achieve synchronous control for rotation of the spindle and feed of the feed shaft (Step S3). The entire process is thus completed.

As has been described above, even if the operation is suspended during tapping under control, the control method for tapping and device therefor according to the present invention can automatically conduct resetting steps after suspension without troublesome manual operation by an operator to thereby significantly reduce machining time.

It should be understood that many modifications and adaptations of the invention will become apparent to those skilled in the art and it is intended to encompass such obvious modifications and changes in the scope of the claims appended hereto.

What is claimed is:

1. A method of controlling a tapping process wherein tapping is performed by synchronizing rotation of a spindle and feed of a feed shaft, wherein, when the tapping process is to be reset after a suspension during a controlled tapping, a first reset position is calculated from the rotational direction of said spindle, feed direction of said feed shaft, rotational angle of said spindle and fed of said feed shaft, and wherein said spindle or said feed shaft is moved from a suspended position to said first reset position, and wherein said spindle and feed shaft are synchronously moved to second reset positions; wherein:

$$(Scn,Zcn) = \left( Sbn, \frac{ZE - ZS}{SE - SS} Zbn \right)$$

wherein: rotation of said spindle and feed of said feed shaft are in the positive direction $(Zbn/Sbn)>(ZE-ZS)/(SE-SS)$, or rotation of said spindle and feed of said feed shaft are in the negative direction and $(Zbn/Sbn)<(ZE-ZS)/(SE-SS)$, if it is assumed that a starting position for trapping is denoted as Ps(Ss,Zs), and an end position for tapping is denoted as PE(SE,ZE), and said suspended position for tapping is denoted as Pbn(Sbn,Zbn) and said first reset position for tapping is denoted as Pcn(Scn,Zcn) and wherein all of the S and Z variables are respectively angles and distances in a radial coordinate system.

2. A method of controlling a tapping process wherein tapping is performed by synchronizing rotation of a spindle and feed of a feed shaft, wherein, when the tapping process is to be reset after a suspension during a controlled tapping, a first reset position is calculated from the rotational direction of said spindle, feed direction of said feed shaft, rotational angle of said spindle and fed of said feed shaft, and wherein said spindle or said feed shaft is moved from a suspended position to said first reset position, and wherein said spindle and feed shaft are synchronously moved to second reset positions; wherein:

$$(Scn,Zcn) = \left( Sbn, \frac{SE - SS}{ZE - ZS} Zb,Zb \right)$$

wherein: rotation of said spindle and feed of said feed shaft are in the positive direction and $(Zbn/Sbn)<(-ZE-ZS)/(SE-SS)$, or rotation of said spindle and feed of said feed shaft are in the negative direction and $(Zbn/Sbn)>(ZE-ZS)/(SE-SS)$, if it is assumed that a starting position for tapping is denoted as Ps(Ss,Zs), and an end position for tapping is denoted as PE(SE,ZE), and said suspended position for tapping is denoted as Pbn(Sbn,Zbn) and said first reset position for tapping is denoted as Pcn(Scn,Zcn) and wherein all of the S and Z variables are respectively angles and distances in a radial coordinate system.

3. A device for controlling tapping which synchronizes the rotation of a spindle and feed of a feed shaft for tapping, which comprises: a memory means for storing relative rotational directions of said spindle and relative feed directions of said feed shaft; a means for reading out said rotational direction and said feed direction at positions at which suspending motion is started upon receipt of a suspension command as well as a relative rotational angle of said spindle and relative feed on said feed shaft at suspended positions; a means for controlling rotation of said spindle or feed of said feed shaft in a manner so as to make a phase difference between said spindle and said feed shaft at said suspended positions equal to zero based on said rotational direction, feed direction, rotation angle and feed which have been read out; and a means for a synchronizing rotation of said spindle and feed of said feed shaft so as to reset them to prescribed positions.

* * * * *